United States Patent [19]
DePoe

[11] Patent Number: 6,032,399
[45] Date of Patent: Mar. 7, 2000

[54] TELESCOPING FISHING NET WITH DEPTH ALARM

[76] Inventor: Stephen Anthony DePoe, 12 Martin Rd., Verona, N.J. 07044

[21] Appl. No.: 09/063,224

[22] Filed: Apr. 20, 1998

[51] Int. Cl.⁷ ................................................ A01K 77/00
[52] U.S. Cl. ..................................................... 43/12
[58] Field of Search .............................. 43/7, 12

[56] References Cited

U.S. PATENT DOCUMENTS

| | | | |
|---|---|---|---|
| 525,619 | 9/1894 | Pearsons | 43/12 |
| 708,797 | 9/1902 | Coffin | 43/12 |
| 1,088,766 | 3/1914 | Borgardt | 43/12 |
| 1,921,323 | 8/1933 | Purdon | 43/12 |
| 2,595,597 | 5/1952 | Morseth | 43/12 |
| 2,600,773 | 6/1952 | Hungerford | 43/12 |
| 2,725,658 | 12/1955 | Wiederhold | 43/12 |
| 2,850,829 | 9/1958 | Buzzini | 43/12 |
| 4,031,650 | 6/1977 | Popeil | 43/12 |
| 4,050,177 | 9/1977 | Gerritsen | 43/12 |
| 5,501,026 | 3/1996 | Bryant | 43/12 |

*Primary Examiner*—Kurt Rowan
*Attorney, Agent, or Firm*—Goldstein & Canino

[57] ABSTRACT

A fishing net, for use by a fisherman, having a proximal end and a distal end. The fishing net comprises a handle portion and a net hoop portion. The handle extends from the proximal end toward the distal end. The handle portion has plurality of telescoping sections, so that it may expand and thus extend the distance between the proximal and distal ends of the fishing net. The net hoop portion is located at the distal end, and has netting material attached thereon. A depth sensor is located in the net hoop portion, for producing a warning enablement signal once a predetermined threshold depth has been detected. An audible and visual warning device is provided at the proximal end of the handle, which warns the fisherman in response to the warning enablement signal that a dangerous depth condition exists.

5 Claims, 3 Drawing Sheets

TELESCOPING FISHING NET WITH DEPTH ALARM

BACKGROUND OF THE INVENTION

The invention relates to a telescoping fishing net with depth alarm. More particularly, the invention relates to a fishing net having a handle with multiple telescoping sections, and a net having a depth sensor which sounds an alarm at the handle when the water depth exceeds a threshold level.

A popular type of fishing involves wading waist deep in the water, and catching fish with a hand-held net. Often, while fishing in such a manner, the desired catch is just beyond reach. Thus, the desire is to have a net with a longer handle. However, long handles have drawbacks, in that they are difficult to transport, especially in small automobiles.

In addition, fishing in this manner can be hazardous, as people tend to wade in unfamiliar waters. If one is not extremely careful, there is a considerable risk of stepping beyond a sudden drop-off point and drowning.

U.S. Pat. Nos. 4,870,773 to Schmucker et al. discloses a collapsible and telescoping fishing net. U.S. Pat. No. 4,995,009 to Altmire et al. discloses a castable fish/depth finder.

While these units may be suitable for the particular purpose employed, or for general use, they would not be as suitable for the purposes of the present invention as disclosed hereafter.

SUMMARY OF THE INVENTION

It is an object of the invention to produce a fishing net with a handle of adjustable length. Accordingly, the handle is telescopic, and thereby capable of adjusting in length by the relative movement of a plurality of telescoping handle sections.

It is another object of the invention to produce a fishing net which preserves the safety of the fisherman by warning the fisherman when the depth exceeds a predetermined threshold level. Accordingly, a depth sensor is provided on the net hoop, which sounds an alarm at the handle once a predetermined depth has been exceeded.

It is a further object of the invention that the fishing net is configured so as to be readily accessible by the fisherman. Accordingly, a strap is provided with a clip, so that the fishing net may be attached around the fisherman's wrist, or to his clothing.

The invention is a fishing net, for use by a fisherman, having a proximal end and a distal end. The fishing net comprises a handle portion and a net hoop portion. The handle extends from the proximal end toward the distal end. The handle portion has plurality of telescoping sections, so that it may expand and thus extend the distance between the proximal and distal ends of the fishing net. The net hoop portion is located at the distal end, and has netting material attached thereon. A depth sensor is located in the net hoop portion, for producing a warning enablement signal once a predetermined threshold depth has been detected. An audible and visual warning device is provided at the proximal end of the handle, which warns the fisherman in response to the warning enablement signal that a dangerous depth condition exists.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
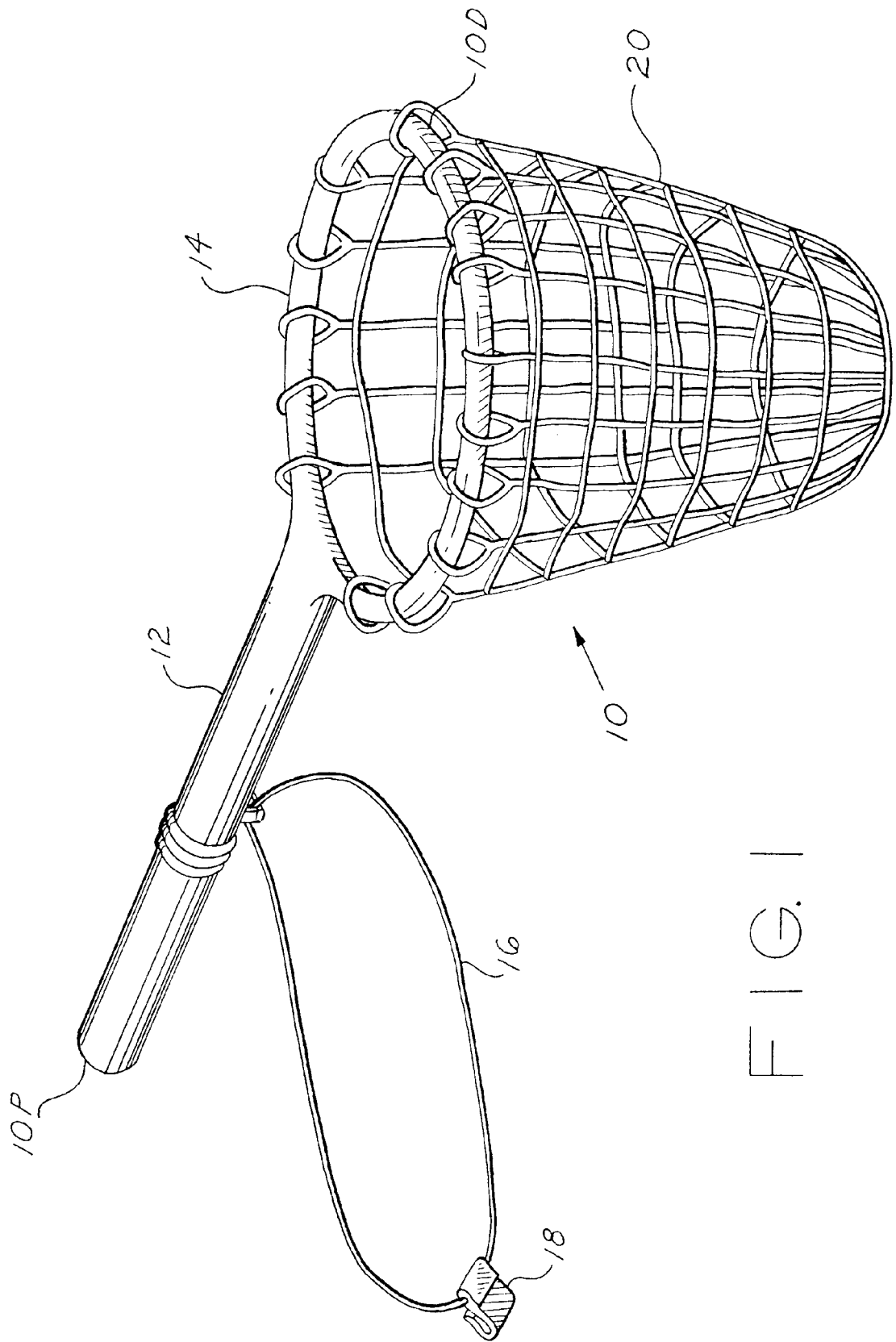
FIG. 1 is a diagrammatic perspective view, illustrating the fishing net according to the present invention, wherein the handle is fully collapsed.

FIG. 1 illustrates a fishing net 10 having a proximal end lop and a distal end 10D. The fishing net has a handle portion 12 extending from the proximal end 10P, and a net hoop portion 14 at the distal end 10D. The fishing net 10 also has a tether 16 which is preferably attached to the handle portion 12 for securing the fishing net 10 to a fisherman or a fisherman's clothing. The tether 16 preferably also has a clip 18 for facilitating securement of the tether 16 to the fisherman's clothing or other equipment.

Netting material 20 is attached to the net hoop portion 14, thus allowing the net hoop portion 14 to be directed at fish or other prey, which is then captured therein.

Figure 2:
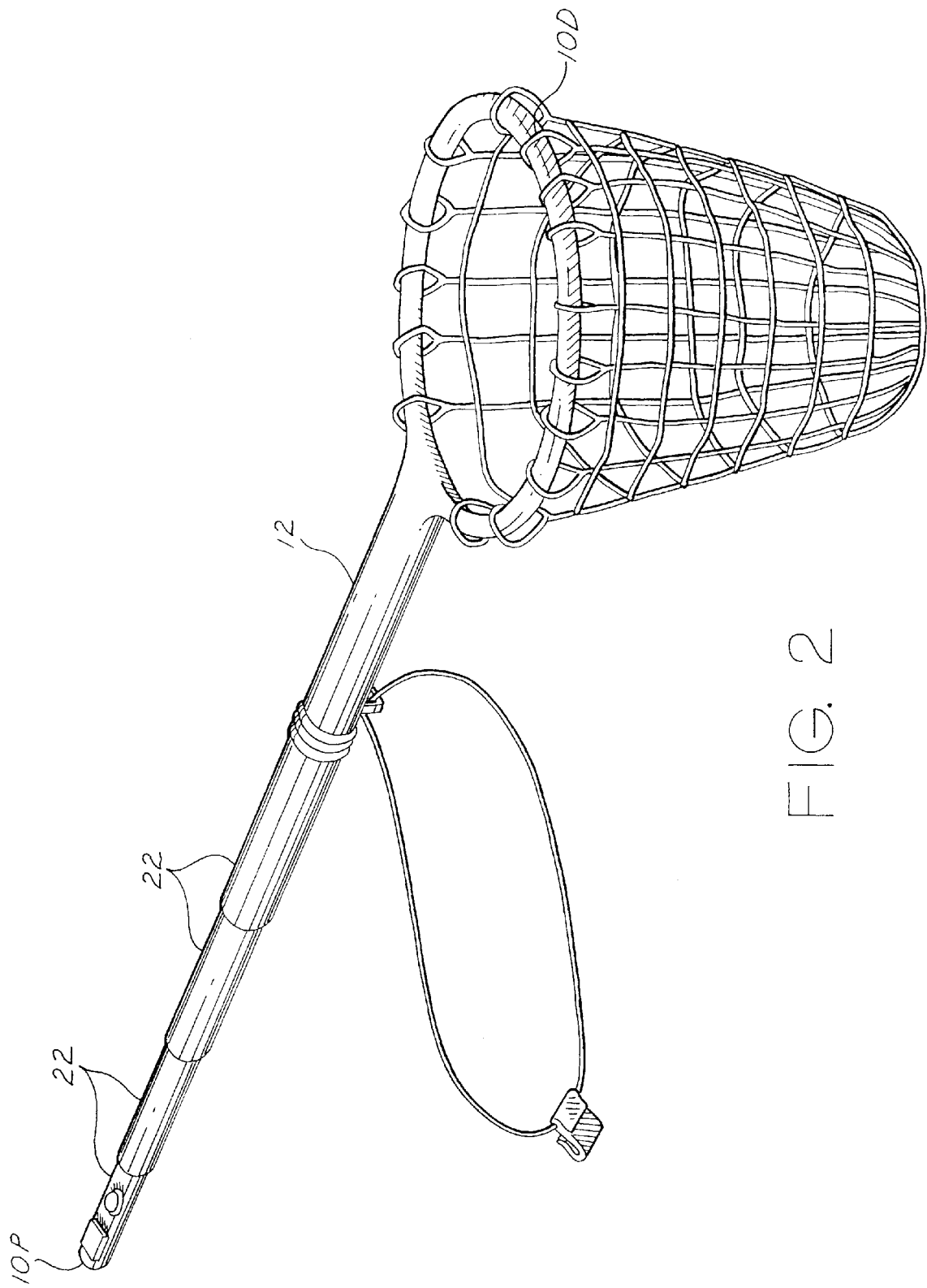
FIG. 2 is a diagrammatic perspective view, illustrating the fishing net according to the present invention, wherein the handle is telescopically expanded.

Referring to FIG. 2, the handle portion 12 actually has a plurality of telescoping sections 22 which allow the handle 12 to expand, thus increasing the distance from the proximal end 10P of the fishing net 10 to the distal end 10D thereof.

Figure 3:
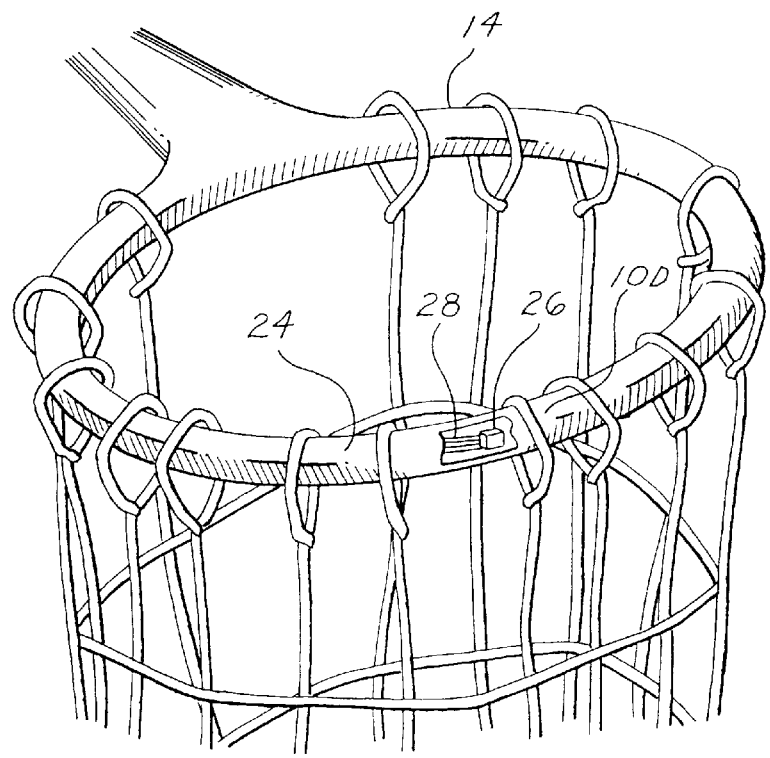
FIG. 3 is a diagrammatic perspective view of just the net hoop section of the invention, wherein a portion of the hoop rim has been broken away to show the depth sensor within.

Referring now to FIG. 3, the net hoop portion 14 includes an outer rim 24. A depth sensor 26 is contained within the outer rim 24 at the distal end 10D of the net hoop portion 14. The depth sensor 26 is either a device capable of emitting a sound and detecting reflections to determine the distance between the distal end 10D and the nearest solid object, or is a simple pressure sensor for detecting the actual depth of the sensor 26 itself. The depth sensor 26 may also be a combination thereof, sensing its actual depth and also determining how much deeper the nearest solid object is. The output produced by the depth sensor 26 is a simple warning enablement output, indicating that the depth detected is greater than a preset threshold level. A preferable threshold level is approximately five feet. Thus a detected depth that is nearly the same as an average person's height will trigger the warning enablement output. The warning enablement output is communicated by sensor wires 28.

Figure 4:
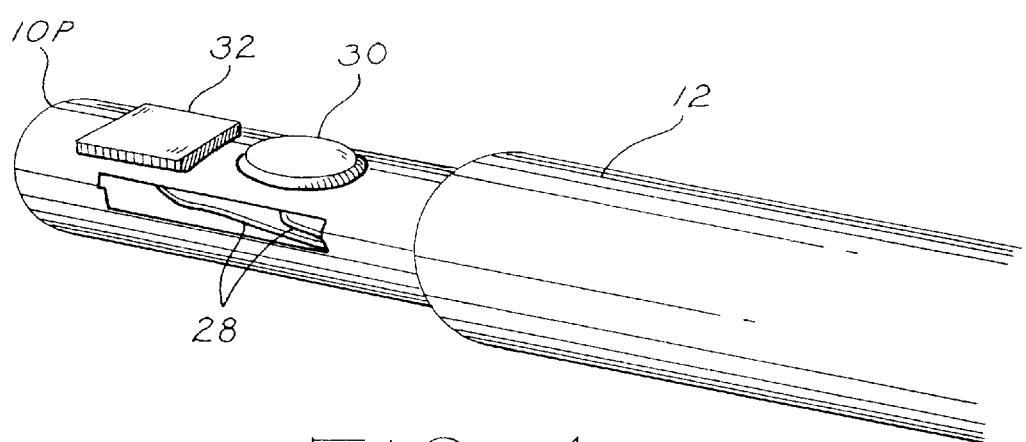
FIG. 4 is an enlarged diagrammatic perspective view with a partial cutaway, showing just the proximal end of the handle, and the alarm circuitry therein.

Referring to FIG. 4, the proximal portion 10P of the handle 12 is depicted in partial cutaway. An alarm circuit is present in the handle, which includes an indicating device 30, and a power switch 32. The sensor wires 28 are in communication with both the indicating device 30 and power switch 32. The indicating device 30 may be a visual indicating device, audible indicating device, or both visual and audible indicating devices. The indicating device 30 produces a warning in response to the warning enablement output from the sensor 26. The power switch 32 may also be a multiple position switch, selectively switching the alarm circuit off, and switching on either visual, audible, or both visual and audible alarms.

In conclusion, herein is presented a fishing net, which contains a telescoping handle for adjusting the length thereof, and which contains a warning device for warning a fisherman that he is approaching an area that is of unsafe depth.

What is claimed is:

1. A fishing net, having a proximal end and a distal end, for use by a fisherman, comprising:
   a handle portion capable of telescoping to increase the distance between the proximal end and distal end;
   a net hoop attached to the handle portion at the distal end, said net hoop having netting material capable of catching fish; and
   a depth sensing device, for determining when the proximal end of the net is beyond a predetermined threshold depth, comprising a depth sensor locating in the net hoop and an indicating device located in the proximal end of the handle.

2. The fishing net as recited in claim 1, wherein the depth sensor produces a warning enablement output, and wherein the indicating device produces audible and visual outputs in response to the warning enablement output.

3. The fishing net as recited in claim 2, further comprising a tether, for allowing selective securement of the fishing net to clothing of the fisherman.

4. The fishing net as recited in claim 3, wherein the tether further comprises a clip, for facilitating easy attachment to the fisherman.

5. The fishing net as recited in claim 4, wherein the handle has at least four telescoping sections.

* * * * *